United States Patent
Allmann et al.

(10) Patent No.: US 10,414,367 B2
(45) Date of Patent: Sep. 17, 2019

(54) TOW HOOK COVER ASSEMBLY FOR AN AUTOMOTIVE BUMPER FASCIA

(71) Applicant: GM Global Technology Operations LLC, Detroit, MI (US)

(72) Inventors: Uwe Allmann, Rüsselsheim (DE); Waldemar Appelhans, Rüsselsheim (DE); Sebastian Lukas, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 15/701,947

(22) Filed: Sep. 12, 2017

(65) Prior Publication Data

US 2019/0077350 A1   Mar. 14, 2019

(51) Int. Cl.
  *B60R 19/04*  (2006.01)
  *B60R 19/48*  (2006.01)
  *B60R 19/18*  (2006.01)

(52) U.S. Cl.
  CPC ...... *B60R 19/48* (2013.01); *B60R 2019/1886* (2013.01)

(58) Field of Classification Search
  CPC ............ B60R 19/48; B60R 2019/1886; B60R 2019/02
  USPC ......................... 296/117; 280/405, 504, 505
  See application file for complete search history.

(56) References Cited

U.S. PATENT DOCUMENTS 8,251,414 B2   8/2012   Brown
8,562,062 B2   10/2013  Mineshima et al.

FOREIGN PATENT DOCUMENTS

JP   20061880082   *   7/2006
JP   2011-168175   *   9/2011

OTHER PUBLICATIONS

Translation of JP2011-168175 (Year: 2011).*
Translation of JP2006-188082 (Year: 2006).*

* cited by examiner

*Primary Examiner* — Dennis H Pedder

(57) ABSTRACT

A bumper fascia having a tow hook opening and a tow hook cover is provided. The bumper fascia includes a perimeter surface surrounding the tow hook opening. A first shaped panel, a second shaped panel, a step surface, and a lip portion extend from the perimeter surface defining the tow hook opening. The shaped panels cooperate with a portion of the perimeter surface to define recessed chambers and two attachment notches. The shaped panels include elongated ribs sitting below the exterior surface of the bumper fascia. The tow hook cover includes a pair of wing segment having chamfered surfaces engageable with the step surface and a pair of L-shaped clips engageable with the attachment notches. The tow hook cover is pivotable about the elongated ribs to engage and disengage the tow hook cover from the bumper fascia.

18 Claims, 3 Drawing Sheets

TOW HOOK COVER ASSEMBLY FOR AN AUTOMOTIVE BUMPER FASCIA

INTRODUCTION

The present disclosure relates to a cover for an opening in an automotive body panel, more particularly to a two hook cover for an opening in an automotive bumper fascia.

A tow hook is mechanically attached to a front portion and/or rear portion of a frame or unibody structure of a motor vehicle in the event the motor vehicle requires towing. The tow hook is either hidden behind the front and/or rear bumper fascia of the motor vehicle or extends through a tow hook opening in the bumper fascia. For ease of access to the tow hook, it is preferable that the tow hook extends through a tow hook opening in the bumper fascia.

For aesthetical pleasing appearance and improved aerodynamics of the motor vehicle, the tow hook that normally extends through the tow hook opening in the bumper fascia is designed such that the tow hook is detachable from the vehicle. When the tow hook is not in use, the tow hook is detached from the vehicle and the opening in the bumper fascia is covered by a tow hook cover.

Typically, tow hook covers are secured to the bumper fascia with a variety of clips and fasteners that requires specialty tools for the removal of the tow hook covers. Thus, while current tow hook covers achieve their intended purpose, there is a need for a new and improved tow hook cover and/or tow hook cover assembly that does not require the use of tools for the removal of the tow hook cover while securely engaging the cover to the bumper fascia when access through the tow hook opening is not needed.

SUMMARY

According to several aspects, a bumper fascia having a tow hook opening and tow hook opening cover is disclosed. The bumper fascia includes a perimeter surface extending in a direction from the exterior surface of the bumper fascia toward the interior surface of the bumper fascia. The perimeter surface defines a predetermined elongated shape extending along a longitudinal axis A. A first shaped panel extends from a portion of the perimeter surface adjacent a first end of the longitudinal axis A toward a second end of the longitudinal axis. The first shaped panel includes a first panel edge. A second shaped panel extends from a portion of the perimeter surface adjacent the second end of the longitudinal axis A toward the first end of the longitudinal axis. The second shaped panel includes a second panel edge. A step surface extends from a portion of the perimeter surface on a first side of the longitudinal axis A. The step surface intersects the first and second shaped panel edges. A lip portion extends from a portion of the perimeter surface on a second side of the longitudinal axis A. The lip portion is spaced between the first panel edge and the second panel edge thereby defining a first attachment notch between the first panel edge and the lip portion, and a second attachment notch between the lip portion and the second panel edge. The tow hook opening is defined by the first and second panel edges, step surface, lip portion, and first and second attachment notches.

In an additional aspect of the present disclosure, the first shaped panel includes a first planar surface having a first elongated rib extending along the longitudinal axis A, and the second shaped panel includes a second planar surface having a second elongated rib extending along the longitudinal axis A. The first and second elongated ribs extend along the longitudinal axis A and sits below the exterior surface of the bumper fascia.

In another aspect of the present disclosure, the first shaped panel includes a first sloped surface intersecting the second elongated perimeter surface thereby defining a first recessed chamber, and the second shaped panel includes a second sloped surface intersecting the second perimeter surface, and a recessed chamber is defined between the second sloped surfaces and the second perimeter surface.

In another aspect of the present disclosure, the tow hook cover includes an exterior surface defining an elongated shape extending along a longitudinal axis B. The elongated shape is complementary to the predetermined elongated shape defined by the perimeter surface. The tow hook cover also includes an interior surface opposite of the exterior surface of the tow hook cover and an arm extending from the interior surface of the tow hook cover on a first side of the longitudinal B axis. The arm includes a distal end having a U-shaped cross-section. A first wing segment extends from a first edge of the U-shape cross-section toward a first end of the longitudinal axis B and a second wing segment extending from a second edge of the U-shape cross-section toward a second end of the longitudinal axis B.

In another aspect of the present disclosure, the first wing segment include a first projection oriented away from the longitudinal B axis and the second wing segment include a second projection oriented away from the longitudinal B axis.

In another aspect of the present disclosure, each of the first and second projections includes a chamfered surface having a tapered edge oriented in a direction away from the interior surface of the tow hook cover and an attachment surface opposite of the tapered edge.

In another aspect of the present disclosure, the tow hook cover further includes a perimeter surface interconnecting the exterior and interior surfaces of the tow hook cover. The perimeter surface of the hook cover includes a plurality of bump protrusions.

In another aspect of the present disclosure, the tow hook cover further includes a pair of L-shaped clips on a second side of the longitudinal axis B, wherein the pair of L-shaped clips are engageable to the first and second attachment notches.

In another aspect of the present disclosure, the perimeter surface of the tow hook cover defines a rhombus shape having a pair of opposite obtuse angled corners and a pair of opposite acute angled corners, wherein the longitudinal axis B extends through the pair of opposite acute angled corners.

According to several aspects, a tow hook cover assembly for a bumper fascia is disclosed. The tow hook cover assembly includes a detachable tow hook cover having an exterior surface defining an elongated shape extending along a longitudinal axis and an interior surface opposite of the exterior surface. The tow hook cover further includes an arm extending from the exterior surface on one side of the longitudinal axis, wherein the arm includes a distal end having a U-shaped cross section; a pair of wing segments extending from either edge of the-shaped cross section in opposite directions, wherein each of the wing segments include a chamfered projections; and a pair of L-shaped clips extending from the interior surface on the other side of the longitudinal axis.

In another aspect of the present disclosure, the tow hook assembly of claim 10 further includes a tow hook receptacle having an exterior surface, an interior surface opposite of the exterior surface, and a perimeter surface extending from the exterior surface in the direction of the interior surface; a pair of shaped panels extending opposite ends of the perimeter surface and a pair of elongated ribs protruding in a direction toward the exterior surface of the tow hook receptacle and sits below the exterior surface of the tow hook receptacle. The pair of elongated ribs is aligned with the longitudinal axis of the tow hook cover such that the tow hook cover is pivotable about the elongated ribs when the tow hook cover is engaged to the tow hook cover receptacle. The exterior surface defines an elongated shape complementary to the elongated shape of the tow hook cover.

In another aspect of the present disclosure, the tow hook receptacle further includes an attachment notches configured to position the tow hook cover by accepting the L-shaped clips of the tow hook cover and a step surface configured to deflect the wing segments of the tow hook cover such as the tow hook cover is being engaged to the tow hook cover receptacle.

In another aspect of the present disclosure, each of the shaped panels include a slope surface intersecting the perimeter surface thereby defining a recessed chamber having sufficient space to accept a portion of the tow hook cover as the tow hook cover is pivoted about the elongated ribs.

In another aspect of the present disclosure, the tow hook cover includes a tether having a barbed end extending from one end of the elongaged shape and the tow hook cover receptacle includes an aperture configured to retain the barbed end of the tether.

In another aspect of the present disclosure, the predetermine shape of the tow hook cover is a rhombus have two opposite obtuse angled corners and two opposite acute angled corners on the longitudinal axis.

In another aspect of the present disclosure, the tow hook cover includes a perimeter surface connecting the exterior surface with the interior surface. The perimeter surface includes a plurality of bump protrusions configured to engage the perimeter surface of the tow hook receptacle to provide an inference fit between the tow hook cover and the tow hook receptacle.

According to several aspects, a bumper fascia having a tow hook cover covering a tow hook opening. The bumper fascia comprising includes a perimeter surface extending in a direction from an exterior surface of the bumper fascia toward an interior surface of the bumper fascia. The perimeter surface defines a general shape of a rhombus surrounding the tow hook opening. The rhombus includes a first obtuse angled corner, a second obtuse angled corner opposite of the first obtuse angled corner, a first acute angled corner, and a second acute angled corner opposite of the first acute angled corner. A step surface extends from the first obtuse angled corner toward the tow hook opening, transitioning into a step attachment surface. A first shaped panel extends from the second acute corner toward the tow hook opening and a second shaped panel extends from the second acute corner toward the tow hook opening. Each of the first and second shaped panels includes a planar surface having an elongated rib protruding in the direction of the exterior surface of the bumper fascia. Each of the elongated ribs sits below the exterior surface of the bumper fascia.

In an additional aspect of the present disclosure, a lip portion extends from the second obtuse angled corner toward the tow hook opening. The lip portion is spaced between the first panel edge and the second panel edge thereby defining a first attachment notch between the first panel edge and the lip portion, and a second attachment notch between the lip portion and the second panel.

In another aspect of the present disclosure, the bumper fascia further includes a tow hook cover having an interior surface opposite of that of an exterior surface, a pair of L-shaped clips extending from a portion of the interior surface, an arm extending from a portion of the interior surface opposite of the portion of the interior surface having the pair of L-shaped clips, a pair of resilient wing segments extending from a distal end of the arm having a U-shaped cross-sectional profile. The pair of L-shaped clips are spaced apart to be engageable to the respective first and second attachment notches. Each of the wing segments includes a projection having a chamfered surface.

In another aspect of the present disclosure, one of the shaped panels includes a second sloped surface extending in a direction away from the exterior surface of the bumper fascia and intersecting the perimeter, thereby defining a recessed chamber between the sloped surface and the perimeter surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
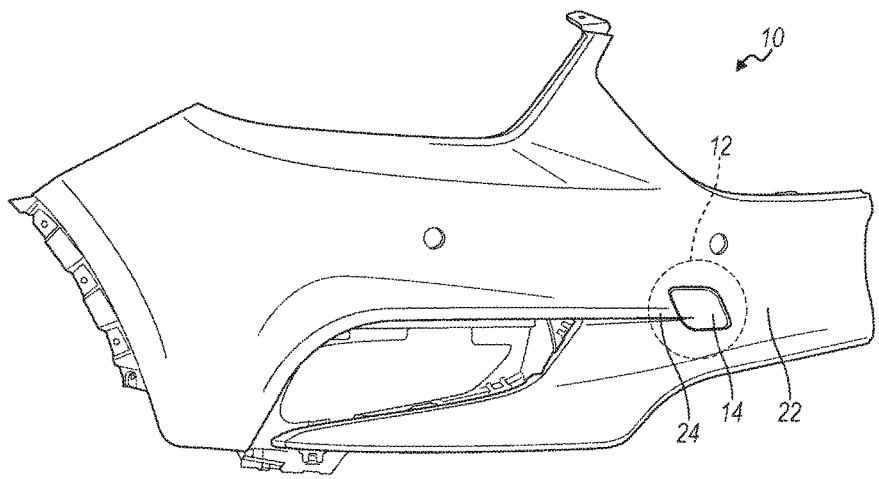
FIG. 1 is a perspective view of a partial front bumper fascia of a motor vehicle having a tow hook cover engaged to a tow hook cover receptacle, according to an exemplary embodiment.

FIG. 1 shows a partial front bumper fascia 10 for a motor vehicle having a tow hook cover assembly 12. Best shown in FIG. 2, the tow hook cover assembly 12 is shown with a tow hook cover 14 engaged to a tow hook cover receptacle 16 for covering up a tow hook opening 18 through the bumper fascia 10. Referring back to FIG. 1, tow hook cover 14 includes an exterior surface 20 that is substantially flush with an adjacent exterior surface 22 of the front bumper fascia 10 when the tow hook cover 14 is engaged to the tow hook cover receptacle 16. The exterior surface 22 of the front bumper fascia 10 may include a contoured design 24 that extends through a portion of the exterior surface 22 of the bumper fascia 10 for aesthetics and/or functional purposes. The contoured design 24 may extend through the exterior surface 20 of the tow hook cover 14 for an uninterrupted continual design scheme through a portion of the bumper fascia 10.

Figure 2:
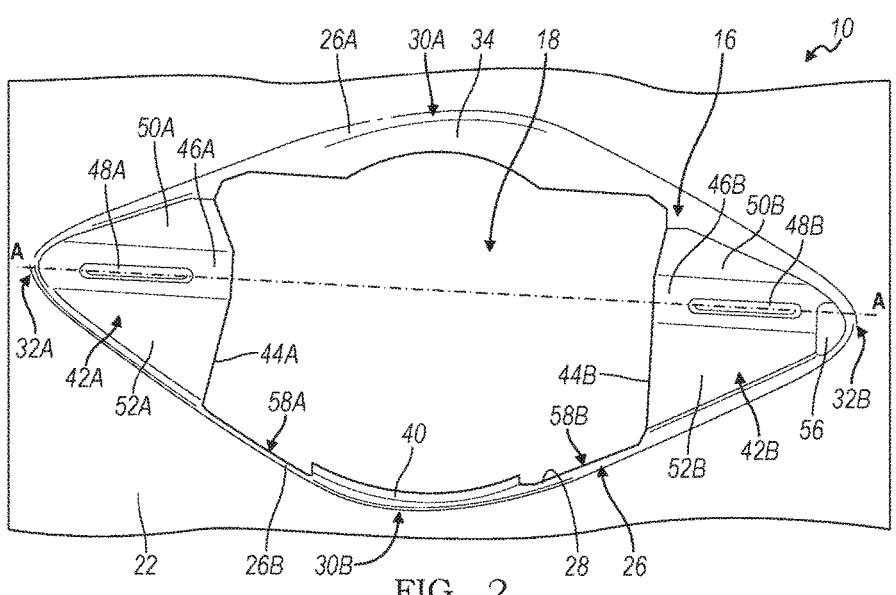
FIG. 2 is a perspective front view of the tow hook cover receptacle defining a tow hook opening through the front bumper fascia of FIG. 1, according to an exemplary embodiment.

FIG. 2 shows a portion of the front bumper fascia 10 of FIG. 1 having the tow hook cover receptacle 16 with the tow hook cover 14 removed. The tow hook cover receptacle 16 defines the tow hook opening 18 for providing a physical access through the bumper fascia 10 to a tow hook attachment point (not shown). A typical tow hook attachment point includes a threaded tow hook connector that is affixed to a reinforced member on the frame of the motor vehicle. The tow hook cover receptacle 16 includes features that cooperates with the features on the tow hook cover 14 to retain the tow hook cover 14 in a fixed position covering the tow hook opening 18 when access to the tow hook attachment point is not required, but also enable the ease of removal of the tow hook cover 14 without the need of tools when access to the tow hook attachment point is required. The cooperating features of the tow hook cover receptacle 16 and tow hook cover 14 is disclosed in detail below.

The tow hook cover receptacle 16 includes a perimeter surface 26 extending in a direction from the exterior surface 22 of the bumper fascia 10 toward an interior surface 28 of the bumper fascia 10. The perimeter surface 26 defines a shape that is complementary to the shape and size of the exterior surface 20 of the tow hook cover 14. In the exemplary embodiment, the perimeter surface 26 defines the general shape of a rhombus having rounded corners. The perimeter surface 26 of the cover receptacle 16 includes a first elongated perimeter surface 26A defining a first obtuse angled corner 30A and an opposite second elongated perimeter surface 26B defining an equal second obtuse angled corner 30B. The first elongated perimeter surface 26A intersects the second elongated perimeter surface 26B along a longitudinal axis A defining a first acute angled corner 32A and an opposite equal acute angled corner 32B. Both of the obtuse angled corners 30A, 30B and both of the acute angled corners 32A, 32B are rounded for improved stress distribution.

A step surface 34 extends from the first obtuse angled corner 30A of the first elongated perimeter surface 26A in a direction toward the tow hook opening 18. Best shown in FIG. 4 and FIG. 4A, the step surface 34 transitions into a step attachment surface 36. Referring back to FIG. 2, the step surface 34 defines a curve 38. A lip portion 40 extends from the second obtuse angled corner 30 B of the second elongated perimeter surface 26B in a direction away from the exterior surface 22 of the bumper fascia 10. A first shaped panel 42A and a second shaped panel 42B extends from the first and second acute corners 32A, 32B, respectively, intersecting the curves step surface 34. The first shaped panel 42A includes a first panel edge 44A and the second shaped panel 42B includes a second panel edge 44B oriented toward the first shaped panel edge 44A.

Each of the first and second shaped panels 44A, 44B includes a planar surface 46A, 46B, respectively. Protruding from each of the planar surfaces 46A, 46B in a direction toward the exterior surface 22 of the bumper 10 is an elongated rib 48A, 48B respectively. The elongated ribs 48A, 48B extend axially along the longitudinal axis A and sits below the exterior surface 22 of the bumper fascia 10. Each of the shaped panels 44A, 44B includes a first sloped surface 50A, 50B extending in a direction away from the exterior surface 22 of the bumper fascia 10 and intersecting the step surface 34 above the longitudinal axis A. Each of the shaped panels 42A, 42B also includes a second sloped surface 52A, 52B extending in a direction away from the exterior surface 22 of the bumper fascia 10 and intersecting the second elongated perimeter surface 26B. Best shown in FIG. 4b, a recessed chamber 54 is defined between the lower sloped surfaces 52A, 52B and the second elongated perimeter surface 26B. An aperture 56 is defined in the second shaped panel 42B adjacent the second acute angled corner 32B. A first attachment notch 58A is defined between the first panel edge 44A and the lip portion 40. Similarly, a second attachment notch 58B is defined between the second panel edge 44B and the lip portion 40.

Figure 3:
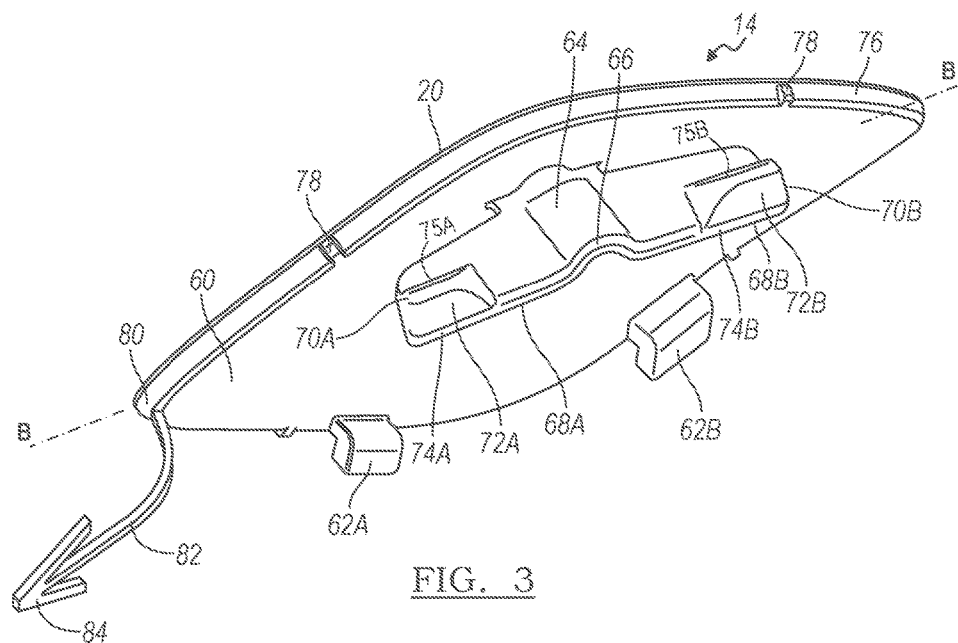
FIG. 3 is a perspective rear view of the tow hook cover of FIG. 1, according to an exemplary embodiment.

Referring to FIG. 3, is a perspective rear view of the tow hook cover 14 extending along a longitudinal axis B. The exterior surface 20 of the hook cover 14 defines substantially the same rhombus shape and size of the opening of the tow hook cover receptacle 16 defined by the perimeter surface 26. The tow hook cover 14 includes an interior surface 60 opposite of that of the exterior surface 20. Extending from a portion of the interior surface 60 below the longitudinal axis B is a pair of L-shaped clips 62A, 62B. The pair of L-shaped clips 62A, 62B are spaced apart to be engageable to the respective first and second attachment notches 58A, 58B defined in when the hook cover 14.

Extending from the interior surface 60 of the tow hook cover 14 above the longitudinal axis B is an arm 64 having a distal end 66 defining a U-shaped cross-sectional profile. Extending from either edge of the U-shaped cross-sectional profile in opposite directions substantially parallel to the longitudinal axis B is a pair of resilient wing segments 68A, 68B. Each of the flexible wing segments 68A, 68B includes a projection 70A, 70B having a chamfered surface 72A, 72B with a tapered edge 74A, 74B oriented in a direction away from the interior surface 60 of the tow hook cover 14. The projection 70A, 70B are sufficient large such that the step surface 74 of the cover receptacle 16 acts upon the chamfered surface 72A, 72B to deflect the wing segments 68A, 68B in a direction toward the longitudinal axis B as the tow hook cover 14 is inserted into the tow hook receptacle 16 during the process of attaching the tow hook cover 14 to the tow hook cover receptacle. An attachment surfaces 75A, 75B is located opposite of each of the tapered edges 74A, 74B. The flexible wing segments 68A, 68B are sufficiently resilient such that the wing segments 68A, 68B flex toward the longitudinal axis B during the installation process and return to the resting first position when engaged to the tow hook receptacle 16.

The tow hook cover 14 includes an edge surface 76 interconnecting the exterior surface 20 and the interior surface 60. The edge surface 76 includes a plurality of spaced bump protrusions 78. The bump protrusions 78 provides an interference fit between the edge surface 76 of the tow hook cover 14 and the perimeter surface 26 of the cover receptacle 16 when the tow hook cover 14 is engaged to the tow hook receptacle 16 covering the tow hook opening 18. Located on a distal corner 80 of the tow hook cover 14, extending from the interior surface 60 is a tether 82 having a barbed distal end 84, which is insertable through the aperture 56 defined in the second shaped panel 42B adjacent the second acute corner 32B.

Figure 4:
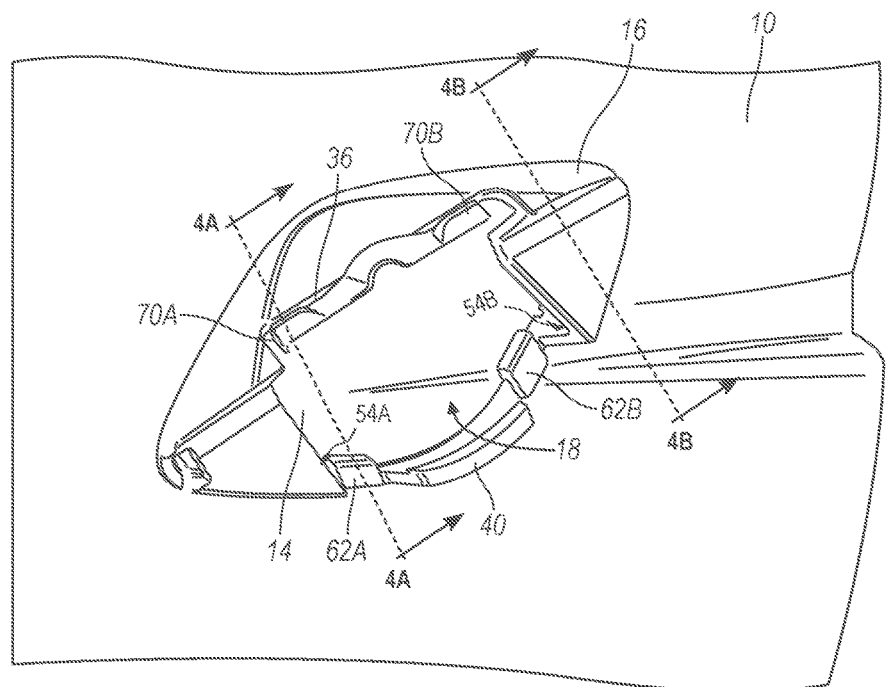
FIG. 4 is a perspective rear view of the tow hook cover engaged to the tow hook cover receptacle for covering the tow hook opening of the front bumper fascia, according to an exemplary embodiment.
Figure 4A:
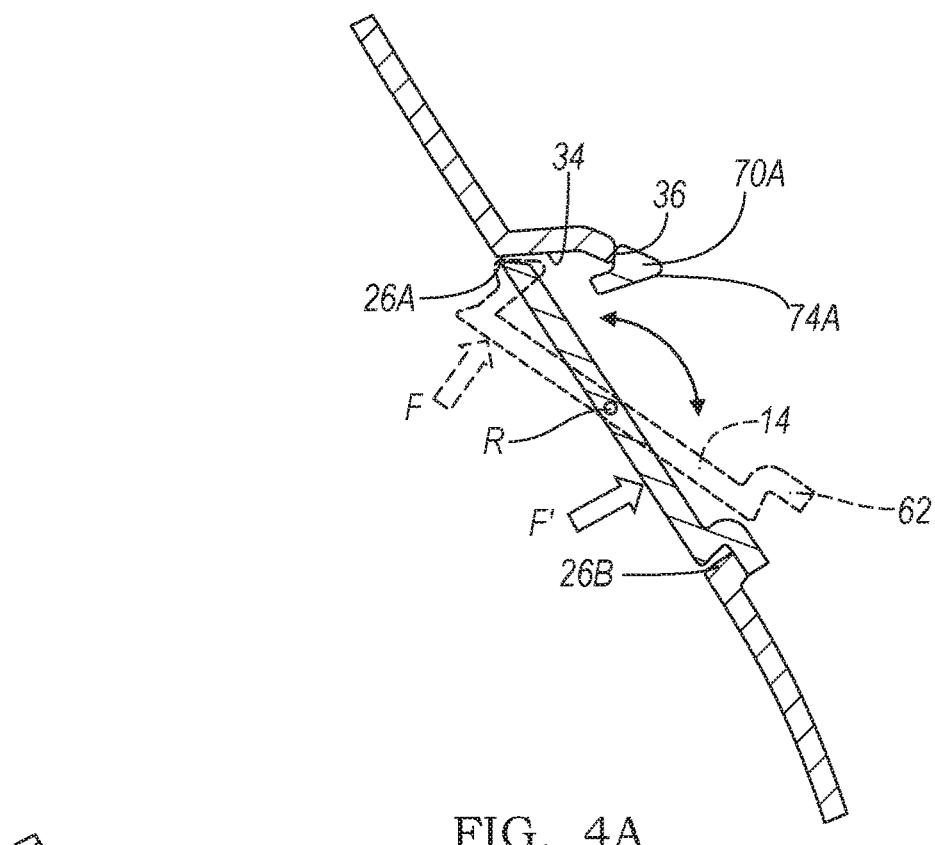
FIG. 4A is a cross-sectional view through section line A-A of FIG. 4, according to an exemplary embodiment.
Figure 4B:
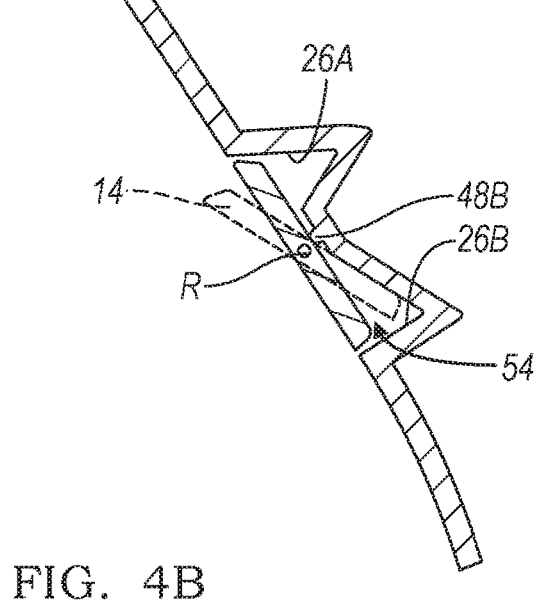
FIG. 4B is a cross-sectional view through section line B-B of FIG. 4, according to an exemplary embodiment.

Referring to FIG. 4, is a perspective rear view of the front bumper fascia 10 having the tow hook cover assembly 12. The tow hook assembly 12 includes the tow hook cover 14 engaged to the tow hook cover receptacle 16, thereby covering the tow hook opening 18. FIG. 4A shows a cross-section of the tow hook cover assembly 12 along section line A-A and FIG. 4B shows a cross-section of the tow hook cover assembly 12 along section line B-B. In FIG. 4A and FIG. 4B, the tow hook cover12 is shown in solid-lines when the tow hook cover is engaged to the tow hook receptacle 16. The tow hook cover 14 is shown in broken-lines when the tow hook cover 12 is dis-engaged from the tow hook receptacle 16.

Referring to FIG. 2, FIG. 4A, and FIG. 4B, the tow hook cover 14 shown in broken lines is assembled onto the tow hook cover receptacle 16 by first aligning the L-shaped clips 62A, 62B onto the corresponding attachment notches 58A, 58B by tilting the tow hook cover 14 into the recessed chambers 54A, 54B, then abutting a portion the interior surface 60 of the tow hook cover 14 against longitudinal extending ribs 48A, 48B, and pressing the tow hook cover 14 at the location and in the direction shown by a force F, represented by a broken-arrow, toward the cover receptacle 16. As the force F is applied, the longitudinal extending ribs 48A, 48B causes the tow hook cover to pivot in a first direction about a pivot axis R. As the tow hook cover 14 is rotated about the rotational axis R, the step surface 34 of the tow hook cover receptacle engages the chamfered surfaces 72A, 72B of the projections 70A, 70B of the wing segments 68A, 68B, thereby biasing the wing segments 68A, 68B to flex toward the longitudinal axis B. Upon the chamfered surfaces 72A, 72B clearing the step surface 34, the wing segments 68A, 68B snaps back into the original position causing the attachment surfaces 75A, 75B of the projection 70A, 70B to engage the step attachment surface 36.

To remove the two hook cover 14, a force F', represented by a solid line, is applied to a portion of the tow hook cover 14 below the longitudinal axis B. As the force F' is applied, the longitudinal extending ribs 48A, 48B causes the tow hook cover 14 to pivot in a second direction about the pivot axis R, thereby disengaging the projections 70A, 70B on the winged segments 68A, 68B and releasing the tow hook cover 14 from the tow hook cover receptacle 16.

The front bumper fascia 10, tow hook cover 14, and tow hook receptacle 16 may be molded from an energy absorbent plastic resin. The tow hook cover receptacle 16 defining the tow hook opening 18 may be integrally molded in the bumper fascia 10 or may be a separate component that is installed onto the front bumper fascia 10. Although a front bumper fascia is depicted, it should be appreciated that the tow hook cover assembly 12 may be applicable to cover a tow hook opening in a rear bumper fascia of the motor vehicle or a tow hook opening in a side panel of the motor vehicle. It should also be appreciated that although only one tow hook cover assembly 12 is depicted on the front bumper fascia, a second tow hook cover assembly 12 may be also be provided to cover a second tow hook opening.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A bumper fascia having a tow hook opening and a tow hook cover, wherein the bumper fascia comprises:
    a perimeter surface extending in a direction from an exterior surface of the bumper fascia toward an interior surface of the bumper fascia, wherein the perimeter surface defines a predetermined elongated shape extending along a longitudinal axis A;
    a first shaped panel extending from a portion of the perimeter surface adjacent a first end of the longitudinal axis A toward a second end of the longitudinal axis, wherein the first shaped panel includes a first panel edge;
    a second shaped panel extending from a portion of the perimeter surface adjacent the second end of the longitudinal axis A toward the first end of the longitudinal axis, wherein the second shaped panel includes a second panel edge;
    a step surface extending from a portion of the perimeter surface on a first side of the longitudinal axis A, wherein the step surface intersects the first and second shaped panel edges; and
    a lip portion extending from a portion of the perimeter surface on a second side of the longitudinal axis A, wherein the lip portion is spaced between the first panel edge and the second panel edge thereby defining a first attachment notch between the first panel edge and the lip portion, and a second attachment notch between the lip portion and the second panel edge;
    wherein the tow hook opening is defined by the first and second panel edges, step surface, lip portion, and first and second attachment notches;
    wherein the first shaped panel includes a first planar surface having a first elongated rib;
    wherein the second shaped panel includes a second planar surface having a second elongated rib; and
    wherein the first and second elongated ribs extend along the longitudinal axis A and sit below the exterior surface of the bumper fascia.

2. The bumper fascia of claim 1, wherein the tow hook cover includes:
    an exterior surface defining an elongated shape extending along a longitudinal axis B, wherein the elongated shape is complementary to the predetermined elongated shape defined by the perimeter surface;
    an interior surface opposite of the exterior surface of the tow hook cover;
    an arm extending from the interior surface of the tow hook cover on a first side of the longitudinal B axis, wherein the arm includes a distal end having a U-shaped cross-section;
    a first wing segment extending from a first edge of the U-shape cross-section toward a first end of the longitudinal axis B; and
    a second wing segment extending from a second edge of the U-shape cross-section toward a second end of the longitudinal axis B.

3. The bumper fascia of claim 2, wherein:
    the first wing segment include a first projection oriented away from the longitudinal B axis, and
    the second wing segment include a second projection oriented away from the longitudinal B axis.

4. The bumper fascia of claim 3, wherein each of the first and second projections includes a chamfered surface having a tapered edge oriented in a direction away from the interior surface of the tow hook cover and an attachment surface opposite of the tapered edge.

5. The bumper fascia of claim 4, wherein the tow hook cover further includes a perimeter surface interconnecting the exterior and interior surfaces of the tow hook cover, wherein the perimeter surface of the hook cover includes a plurality of bump protrusions.

6. The bumper fascia of claim 5, wherein the tow hook cover further includes a pair of L-shaped clips on a second side of the longitudinal axis B, wherein the pair of L-shaped clips are engageable to the first and second attachment notches.

7. The bumper fascia of claim 6, wherein the perimeter surface of the tow hook cover defines a rhombus shape.

8. A tow hook cover assembly for a bumper fascia, comprising:
- a detachable tow hook cover having an exterior surface defining an elongated shape extending along a longitudinal axis and an interior surface opposite of the exterior surface, wherein the tow hook cover further includes:
- an arm extending from the interior surface on one side of the longitudinal axis, wherein the arm includes a distal end having a U-shaped cross section,
- a pair of wing segments extending from either edge of the-shaped cross section in opposite directions, wherein each one of the pair of wing segments include a chamfered projections, and
- a pair of L-shaped clips extending from the interior surface on the other side of the longitudinal axis.

9. The tow hook assembly of claim 8 further comprising a tow hook receptacle including:
- an exterior surface;
- an interior surface opposite of the exterior surface;
- a perimeter surface extending from the exterior surface in the direction of the interior surface, wherein the exterior surface defines an elongated shape complementary to the elongated shape of the tow hook cover;
- a pair of shaped panels extending opposite ends of the perimeter surface; and
- a pair of elongated ribs protruding from the exterior surface of the tow hook receptacle and sit below a surface of the bumper fascia;
- wherein the pair of elongated ribs is aligned with the longitudinal axis of the tow hook cover such that the tow hook cover is pivotable about the pair of elongated ribs when the tow hook cover is engaged to the tow hook cover receptacle.

10. The tow hook assembly of claim 9 wherein the tow hook receptacle, further includes:
- attachment notches configured to position the tow hook cover by accepting the L-shaped clips of the tow hook cover;
- a step surface configured to deflect the wing segments of the tow hook cover such as the tow hook cover is being engaged to the tow hook cover receptacle.

11. The tow hook assembly of claim 10 wherein each of the shaped panels include a slope surface intersecting the perimeter surface thereby defining a recessed chamber having sufficient space to accept a portion of the tow hook cover as the tow hook cover is pivoted about the pair of elongated ribs.

12. The tow hook assembly of claim 10, wherein the tow hook cover includes a tether having a barbed end extending from one end of the elongated shape and the tow hook cover receptacle includes an aperture configured to retain the barbed end of the tether.

13. The tow hook assembly of claim 10, wherein the predetermined shape of the tow hook cover is a rhombus having two opposite obtuse angled corners and two opposite acute angled corners.

14. The tow hook assembly of claim 10, wherein the tow hook cover includes a perimeter surface connecting the exterior surface with the interior surface, wherein the perimeter surface includes a plurality of bump protrusions configured to engage the perimeter surface of the tow hook receptacle to provide an inference fit between the tow hook cover and the tow hook receptacle.

15. A bumper fascia having a tow hook opening, said bumper fascia comprising:
- a perimeter surface extending in a direction from an exterior surface of the bumper fascia toward an interior surface of the bumper fascia, wherein the perimeter surface defines a general shape of a rhombus surrounding the tow hook opening, said rhombus having a first obtuse angled corner, a second obtuse angled corner opposite of the first obtuse angled corner, a first acute angled corner, and a second acute angled corner opposite of the first acute angled corner;
- a step surface extending from the first obtuse angled corner toward the tow hook opening, wherein the step surface transitions into a step attachment surface;
- a first shaped panel extending from the first acute corner toward the tow hook opening; and
- a second shaped panel extending from the second acute corner toward the tow hook opening;
- wherein each of the first and second shaped panels includes a planar surface having an elongated rib protruding in the direction toward the exterior surface of the bumper fascia, and
- wherein each of the elongated ribs sit below the exterior surface of the bumper fascia.

16. The bumper fascia of claim 15, further comprising a lip portion extending from the second obtuse angled corner toward the tow hook opening, wherein the lip portion is spaced between the first shaped panel and the second shaped panel thereby defining a first attachment notch between the first shaped panel and the lip portion, and a second attachment notch between the lip portion and the second shaped panel.

17. The bumper fascia of claim 16, further comprising:
- a tow hook cover 14 having an interior surface opposite of that of an exterior surface;
- a pair of L-shaped clips extending from a portion of the interior surface, wherein the pair of L-shaped clips are spaced apart to be engageable to the respective first and second attachment notches;
- an arm extending from a portion of the interior surface opposite of the portion of the interior surface having the pair of L-shaped clips, wherein the arm includes a distal end having a U-shaped cross-sectional profile;
- a pair of resilient wing segments extending from the distal end, wherein each of the wing segments includes a projection having a chamfered surface.

18. The bumper fascia of claim 17, wherein one of the shaped panels includes a second sloped surface extending in a direction away from the exterior surface of the bumper fascia and intersecting the perimeter, thereby defining a recessed chamber between the sloped surface and the perimeter surface.

* * * * *